Figure 1:
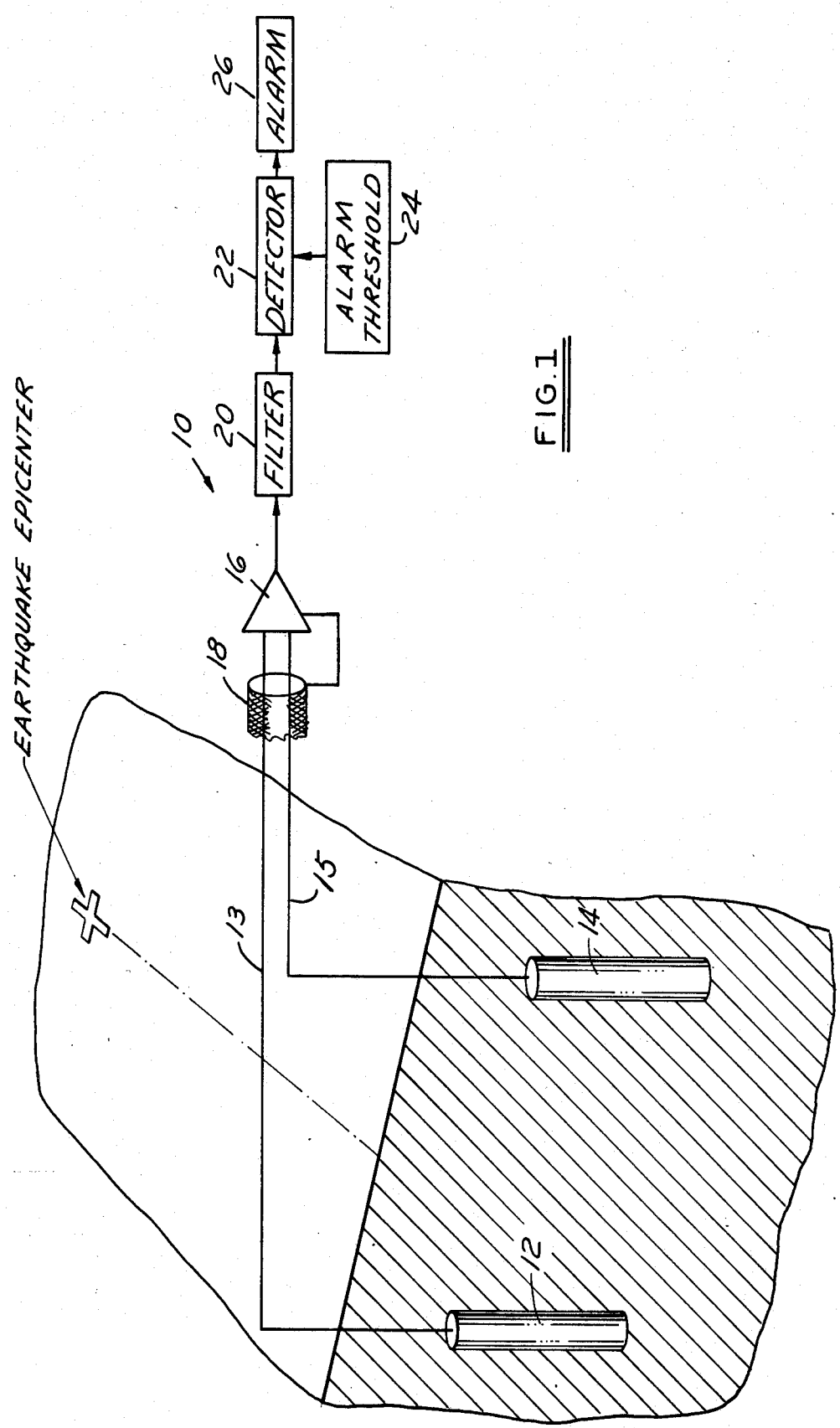

United States Patent [19]

Varotsos et al.

[11] Patent Number: 4,612,506
[45] Date of Patent: Sep. 16, 1986

[54] METHOD OF FORECASTING SEISMIC ACTIVITY RESPONSIVE TO EARTH CURRENTS

[76] Inventors: Panayiotis A. Varotsos, Knossos str. 36, Glyfada, Attica; Kessar D. Alexopoulos, Spefsipou str. 7, Athens 139; Konstantine D. Nomicos, Charilaou Trikoupi 154, Athens 709, all of Greece

[21] Appl. No.: 340,219

[22] Filed: Jan. 18, 1982

[51] Int. Cl.[4] .............................................. G01V 3/08
[52] U.S. Cl. ................................................... 324/348
[58] Field of Search ................ 324/348, 349; 340/690; 73/594

[56] References Cited

U.S. PATENT DOCUMENTS

| | | | |
|---|---|---|---|
| 2,054,067 | 9/1936 | Blau et al. | 324/354 X |
| 2,284,990 | 6/1942 | Schlumberger | 324/349 |
| 2,777,111 | 1/1957 | Hunter | 324/348 |
| 3,496,768 | 2/1970 | Boucher | 324/348 |
| 4,300,135 | 11/1981 | Korn et al. | 340/690 |

OTHER PUBLICATIONS

Coe, "Earthquake Prediction Program in the People's Republic of China", *Trans. Amer. Geophysical Union*, 52, p. 942 (1971).

Rikitake et al., "Precursory and Coseismic Changes in Ground Resistivity", *Earthquake Prediction*, Center for Academic Publications, Japan (1978), pp. 161–173.

Sobolev, "Application of Electric Method to the Tentative Short-Term Forecast of Kamchatka Earthquakes", *Pageophysics*, 113, pp. 226–235 (1975).

*Primary Examiner*—Ernest F. Karlsen
*Assistant Examiner*—Walter E. Snow
*Attorney, Agent, or Firm*—Barnes, Kisselle, Raisch, Choate, Whittemore & Hulbert

[57] ABSTRACT

A method of forecasting earthquakes as a function of transient variations in electric earth currents and apparatus for practicing such method. Transient variations in earth currents are detected from electrodes buried in the earth and portions of the transient variations within preselected frequency ranges are selected. The amplitude of such portions are then compared to predetermined standards for predicting magnitude, location and/or time of occurrence of an impendent earthquake.

10 Claims, 2 Drawing Figures

METHOD OF FORECASTING SEISMIC ACTIVITY RESPONSIVE TO EARTH CURRENTS

The present invention relates to the forecasting or prediction of seismic activity, and particularly to a method and apparatus for accurately predicting the magnitude, location and time of occurrence of earthquakes.

Many techniques have heretofore been proposed for predicting earthquakes, ranging in sophistication from measurement of tectonic activity to observation of insect and other animal behavior patterns. Although some success has been reported, these techniques have not been demonstrated to yield a reliable indication of an impending earthquake, let alone accurately to forecast the magnitude, time of occurrence and epicenter.

A general object of the present invention, therefore, is to provide a method of accurately forecasting the occurrence of violent seismic activity such as earthquakes, and an apparatus for practicing such method. Another and more specific object of the invention is to provide a method and apparatus for predicting or forecasting the occurrence of an earthquake with sufficient advanced notice to permit precautionary measures and/or evacuation as indicated.

A further object of the invention is to provide a method and apparatus for the described purpose which is adapted adjustably to be responsive to impending seismic activity of predetermined threshold magnitude which poses danger to building structures in the surrounding area.

Yet another object of the invention is to provide a method and apparatus for accurately forecasting the magnitude, time of occurrence and epicenter location of an impending earthquake.

In accordance with the present invention, it has been discovered that the electric currents which normally flow in the earth, termed telluric currents in the art, undergo transient changes or variations of a specific nature or character at times before the occurrence of the earthquake. Specifically, it has been found through extensive experimentation that earthquakes are preceded by a first transient variation in telluric earth current measurable as a voltage on the order of hundreds of microvolts per earth-meter having about one minute duration occurring from six to eight hours before the quake, and a second transient change in earth current measurable as a voltage on the order of tens of millivolts per meter having a duration of a few milliseconds and occurring between thirty seconds and four minutes before the quake.

Briefly stated, the present invention contemplates detection of these transient changes in telluric earth currents, particularly the variation occurring several hours before the quake, and forecasting the time of occurrence, magnitude and/or epicenter based upon such earth current variations. One important embodiment contemplates comparison of the magnitude or amplitude of detected variations with a threshold predetermined empirically to correspond to a minimum which will cause potential damage to building structures in the area, and activation of an alarm to give notice that the buildings should be evacuated.

Figure 2:
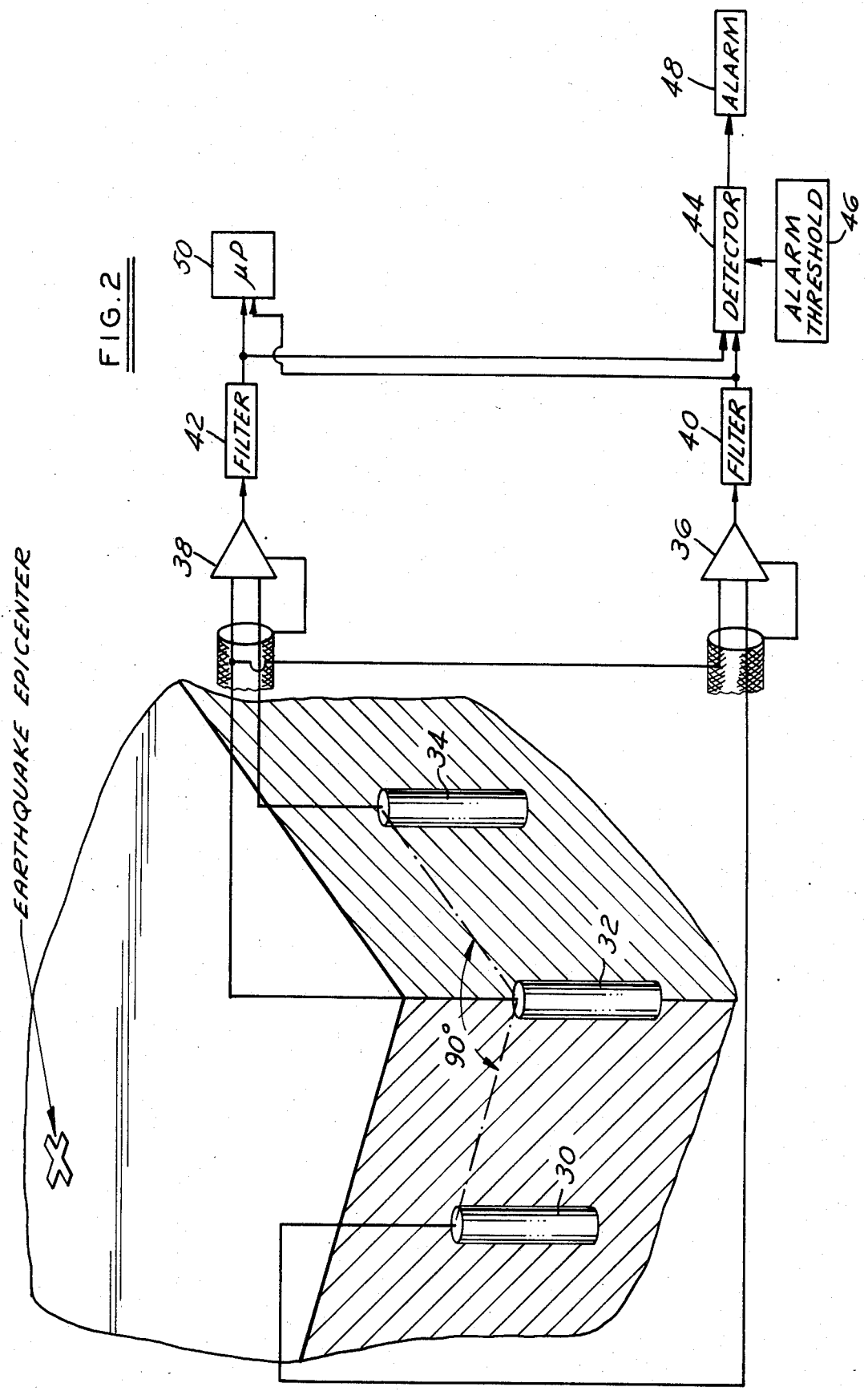

The method and apparatus in accordance with the invention, together with additional objects, features and advantages thereof, will be best understood from the following description, the appended claims and the accompanying drawings wherein FIGS. 1 and 2 are schematic diagrams of respective presently preferred embodiments of apparatus for practicing the invention.

More specifically, FIG. 1 illustrates a basic embodiment 10 of an apparatus in accordance with the invention which is particularly useful where the epicenter of seismic activity is known in advance. The embodiment 10 comprises a pair of electrodes 12, 14 buried beneath the earth surface and connected by shielded cables 13, 15 to respective inputs of a differential amplifier 16. Electrodes 12, 14 may comprise cylinders of brass, copper or other conductive material having a diameter on the order of four to eight centimeters, for example, and a length on the order of twenty centimeters. Electrodes 12, 14 are buried a meter or more beneath the earth surface with axes oriented vertically in a common plane normal to the direction to the known epicenter. The electrodes may also comprise conductive sheet material wrapped around the foundation pillars of a building. Most preferably, amplifier 16 has a floating ground reference input connected to the shielding 18 surrounding the cables 13, 15.

The output of amplifier 16 is connected to a filter network 20 for selecting between the two types of transient earth current variations previously mentioned. In particular, for detection of changes in earth current of the type previously mentioned occurring six to eight hours before the actual quake, filter network 20 should be of a lowpass nature and attenuate all frequencies above one hertz. For the second type of earth current variation occurring minutes before the quake, filter network should attenuate frequencies of fifty (or sixty) and one hundred (or one hundred and twenty) hertz. Further all frequencies below one Hertz should be attenuated. Perhaps most preferably, filter 20 may comprise two separate filter networks respectively responsive to corresponding earth current variations and providing respective separate filter outputs.

The output of filter network 20 is connected to a threshold detector 22 which receives a reference input from a threshold circuit 24 such as a variable resistor. Threshold circuit 24 preferably is field adjustable to accommodate varying conditions. The magnitude of the changes in earth current preceding an earthquake of given intensity must be determined empirically for each location in the present state of the art. Variables affecting the intensity of earth current changes include distance from the earthquake epicenter and earth conductivity, in addition to the magnitude of the quake itself.

In Greece, it has been found that the magnitude of the transient changes in earth current measured one hundred kilometers from the epicenter of a quake measuring 4 on the Richter scale are on the order of one hundred microvolts per meter between electrodes 12, 14 in the case of the current change six to eight hours before occurrence, and on the order of ten millivolts per meter for the change 0.5 to four minutes before the quake. A quake of this magnitude is sufficient to shake buildings, so detection of earth current change of these levels trigger detector 22 and thereby operate an alarm 26 to call for safety measures such as building evacuation.

FIG. 2 illustrates several modifications to the basic embodiment of FIG. 1. Where the direction of the epicenter is unknown, it is preferable to provide an array of at least three electrodes 30, 32, 34 paired with axes in orthogonal planes. Electrodes 30, 32 are connected to a differential amplifier 36, and electrodes 32, 34 are likewise connected to a second differential amplifier 38. The output of each differential amplifier 36, 38 is connected through a corresponding filter 40, 42 to respective inputs of a threshold detector 44. Detector 44 receives a threshold reference input from a threshold circuit 46 and is responsive to the output of either filter 40, 42 exceeding such threshold to activate an alarm 48.

The outputs of filters 40, 42 are also connected to a microprocessor 50 which may be programmed to compare the detected transient earth current deviations received from the filter networks with current variation patterns stored in memory for predicting details of the impending quake, such as intensity and location. It has been found that the pattern of earth current variations (frequency and amplitude characteristics) remain uniform for quakes emitted from any given focus of seismic activity. This waveform may be stored in microprocessor 50 and compared to any incoming signal pattern. This feature is particularly advantageous in areas that are susceptible to variations in earth current from other sources such as power lines which are considered to be in the nature of noise insofar as the present invention is concerned.

It is also envisioned that the epicenter of an earthquake may be located in advance of the actual quake by comparing the magnitude of the transient earth current variations over an area which includes the epicenter. The amplitude of the transient variation will be greatest close to the epicenter and will diminish outwardly therefrom. A network of detecting embodiments connected to a central computing station can determine the epicenter and the magnitude from intensities detected at each site.

The invention claimed is:

1. A method of forecasting earthquakes as a function of variations in telluric electrical earth current comprising the steps of positioning a pair of electrodes beneath the earth surface at each of a plurality of spaced locations, measuring a voltage developed between said electrodes at each said location as a function of telluric earth currents passing therebetween, identifying a transient change in said voltage of preselected amplitude and frequency characteristics at each said location, and following termination of said transient change of preselected amplitude and frequency characteristics forecasting time of occurrence, magnitude and epicenter of an earthquake as a function of said amplitude and frequency characteristics at each said location and comparison of said characteristics at said plurality of locations to each other, said transient change having a time duration which is less than the time between termination of said transient change and the forecast time of occurrence of said earthquake.

2. The method set forth in claim 1 wherein said step of identifying a transient change comprises the step of identifying said change at a frequency below one hertz and a duration of substantially longer than one minute.

3. The method set forth in claim 1 or 2 wherein said step of identifying a transient change comprises the step of identifying a change in the frequency range above one hertz and a duration of a few milliseconds.

4. The method set forth in claim 1 wherein said step of positioning said electrodes comprises the step of positioning first and second planar arrays of electrodes beneath the earth surface, said planar arrays being orthogonal to each other.

5. A method of forecasting seismic activity such as earthquakes comprising the steps of detecting variations in telluric electrical currents flowing through the earth at a plurality of locations, forecasting time of occurrence of a seismic event as a function of frequency characteristics of said telluric earth current variations, and predicting epicenter and magnitude of the forecast seismic event by comparing to each other magnitudes of said telluric earth current variations detected at said plurality of locations.

6. The method set forth in claim 5 comprising the additional steps of measuring the magnitude of said telluric earth current variations and detecting an earthquake alarm condition when said magnitude exceeds a preselected threshold.

7. A method of forecasting seismic activity such as earthquakes comprising the steps of detecting transient variations in telluric electrical currents flowing through the earth at a plurality of locations; and, following termination of said transient variations, forecasting occurrence at a later time of a seismic event as a function of said telluric earth current variations by measuring the magnitude and time duration of said telluric earth current variations and detecting an earthquake alarm condition when said magnitude exceeds a preselected threshold, and predicting epicenter and magnitude of the forecast seismic event by comparing to each other magnitudes of variations of earth currents detected at said plurality of locations.

8. The method set forth in claim 6 or 7 comprising the additional step of selecting said threshold empirically to correspond to a magnitude of telluric earth current variation indicative of a seismic event capable of causing structural damage.

9. The method set forth in claim 6 or 7 comprising the steps of selecting portions of said telluric earth current variations within a preselected frequency range and detecting said alarm condition responsive to amplitude of said portions within said range.

10. The method set forth in claim 9 wherein said step of detecting said alarm condition comprises the step of comparing said portions within said range to precollected indicia indicative of an impendent earthquake.

* * * * *